(12) United States Patent
Wirachowski

(10) Patent No.: US 10,690,220 B2
(45) Date of Patent: Jun. 23, 2020

(54) ABSORBER SYSTEM

(71) Applicant: ZF FRIEDRICHSHAFEN AG, Friedrichshafen (DE)

(72) Inventor: Michael Wirachowski, Würzburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 179 days.

(21) Appl. No.: 15/034,836

(22) PCT Filed: Oct. 7, 2014

(86) PCT No.: PCT/EP2014/071416
§ 371 (c)(1),
(2) Date: May 5, 2016

(87) PCT Pub. No.: WO2015/067423
PCT Pub. Date: May 14, 2015

(65) Prior Publication Data
US 2016/0273614 A1    Sep. 22, 2016

(30) Foreign Application Priority Data
Nov. 7, 2013  (DE) .................. 10 2013 222 640

(51) Int. Cl.
*F16F 15/14* (2006.01)
(52) U.S. Cl.
CPC ........ *F16F 15/145* (2013.01); *F16F 2230/00* (2013.01); *F16F 2232/02* (2013.01)

(58) Field of Classification Search
CPC .. F16F 15/145; F16F 15/1457; F16F 15/1471; F16F 15/1407
See application file for complete search history.

(56) References Cited

U.S. PATENT DOCUMENTS

| | | | | |
|---|---|---|---|---|
| 5,495,924 A | * | 3/1996 | Shaw .................... | F16F 15/145 188/378 |
| 8,161,740 B2 | * | 4/2012 | Krause ................. | F16F 15/145 192/30 V |

(Continued)

FOREIGN PATENT DOCUMENTS

| DE | 100 59 101 | 5/2002 |
|---|---|---|
| DE | 10 2008 057 647 | 6/2009 |

(Continued)

*Primary Examiner* — Daniel D Yabut
(74) *Attorney, Agent, or Firm* — Cozen O'Connor

(57) ABSTRACT

A mass damper system with a damper mass support receives a damper mass. A guide track and damper mass are in operative connection with one another by a coupling element movable in the guide track between a central position in which the coupling element is free from deflection in circumferential direction of the guide tracks and a deflection position out of the central position. The guide tracks and the coupling element are configured for an order that depends on the number of cylinders of the respective exciting drive. The guide tracks are tailored with respect to their geometric configuration for excitations of a virtual order between a first order associated with excitations of a drive with a first number of cylinders and a second order with which are associated with excitations of a drive with a second number of cylinders.

4 Claims, 4 Drawing Sheets

(56) References Cited

U.S. PATENT DOCUMENTS

| | | | | |
|---|---|---|---|---|
| 2011/0088989 A1* | 4/2011 | Agner | ....................... | F16D 3/12 |
| | | | | 192/48.601 |
| 2014/0174869 A1* | 6/2014 | Takikawa | .............. | F16F 15/145 |
| | | | | 188/378 |
| 2014/0352290 A1* | 12/2014 | Horita | .................. | F16F 15/145 |
| | | | | 60/330 |
| 2015/0101450 A1* | 4/2015 | Kuhnle | ................ | F16F 15/145 |
| | | | | 74/574.2 |
| 2015/0292594 A1* | 10/2015 | Nishii | ................... | F16F 15/145 |
| | | | | 74/574.2 |

FOREIGN PATENT DOCUMENTS

| | | |
|---|---|---|
| DE | 10 2010 054 254 | 6/2011 |
| DE | 10 2011 076 790 | 12/2012 |
| DE | 100 66 436 | 2/2013 |
| DE | 10 2012 21995 | 5/2013 |

* cited by examiner

ABSORBER SYSTEM

CROSS REFERENCE TO RELATED APPLICATIONS

This is a U.S. national stage of application No. PCT/EP2014/071416, filed on Oct. 7, 2014. Priority is claimed on German Application No.: DE102013222640.3, filed Nov. 7, 2013, the content of which is incorporated here by reference.

BACKGROUND OF THE INVENTION

1. Field of the Invention

The present invention is directed to a mass damper system and to a method for configuring a mass damper system. The mass damper system is provided with a damper mass support that serves to receive at least one damper mass, the damper mass support and the at least one damper mass have at least one guide track, and the guide tracks of the damper mass support and damper mass are in operative connection with one another by at least one coupling element in that the coupling element is movable in a relative manner in the guide track of the damper mass support and in the guide track of the damper mass, specifically between a central position in which the coupling element is free from deflection in circumferential direction of the guide tracks and a deflection position in which a deflection has taken place in circumferential direction out of the central position. A composite comprising the guide tracks and the coupling element associated with the latter is configured for an order which depends on the number of cylinders of the respective exciting drive.

2. Description of the Prior Art

A mass damper system of the type mentioned above is known from DE 100 66 436 B4. As can be seen from FIG. 3, a plurality of damper masses are received at a damper mass support, each of these damper masses having two guide tracks in which a coupling element producing the operative connection to the associated guide tracks of the damper mass support is received in each instance so as to be movable in a relative manner. The mass damper system can be tuned in different ways to a certain order of excitation generated by a drive such as an internal combustion engine, namely through geometric configuration of the guide tracks and through selection of the damper masses, but also by defining the quantity of damper masses. Due to the fact that there is usually a specified installation space and weight in a motor vehicle that sets a limit on the mass of the individual damper mass and a limit on the quantity of damper masses along the circumference of the damper mass support, the geometric configuration of the guide tracks makes up the crucial component for tailoring the damper masses to a certain order.

The order of the excitations generated by a drive such as an internal combustion engine depends on the number of cylinders in this drive such that, for example, in a six-cylinder drive the third order is the determining order, in a four-cylinder drive the second order is the determining order, and in a three-cylinder drive the 1.5th order is the determining order. This is contingent upon the quantity of ignitions per revolution of a crankshaft of the drive, so that when the drive is formed as a four-stroke engine three ignitions take place per revolution of the crankshaft in a six-cylinder drive, two ignitions take place per revolution of the crankshaft in a four-cylinder drive and 1.5 ignitions take place per revolution of the crankshaft in a three-cylinder drive. This means that the guide tracks in the damper mass support and damper mass must have a different geometric configuration for each of these drives. Since other drives with numbers of cylinders deviating from those in the above-mentioned drives are known in motor vehicles, it can be established that a producer of mass damper systems must stock a wide variety of damper mass supports and damper masses to provide the suitable mass damper system for the different drive variants. This is uneconomical and expensive.

FIG. 3 shows exemplary guide tracks for mass damper systems, namely, for four-cylinder to six-cylinder drives. The guide tracks differ from one another with respect to their geometric configuration. The diameter D of the coupling elements, the center of gravity of the damper masses and the order to be damped are specified for configuring the mass damper system, and the radii R1 to R3 of the guide tracks in the damper mass support and damper masses are calculated therefrom. There is an increase in the radii R1, R2, R3 of the respective guide track 13 as the number of cylinders decreases so that, compared to a mass damper system for six-cylinder drives shown in FIG. 3c, the radius R2 in a mass damper system for five-cylinder drives shown in FIG. 3b is already increased relative to the radius R3 for six-cylinder drives, and the radius R1 in a mass damper system for four-cylinder drives shown in FIG. 3a is larger still than the radius R2 for five-cylinder drives. Radii R1 to R3 proceed from piercing points S1 to S3. Since the requirements for configuring the mass damper system in accordance with the number of cylinders of the respective drive are sufficiently met by predetermining the geometric configurations of the guide tracks, the coupling element 18 for all three configurations is dimensioned with an identical diameter D.

SUMMARY OF THE INVENTION

It is an object of one aspect of the invention to configure a mass damper system in such a way that it is suitable for the greatest possible number of drives with the least possible quantity of components.

According to one key aspect of the present invention, this object is met through a mass damper system and through a method for the configuration of a mass damper system.

The mass damper system is provided with a damper mass support that serves to receive at least one damper mass, this damper mass support and the at least one damper mass has at least one guide track, wherein the guide tracks of the damper mass support and damper mass are in operative connection with one another by at least one coupling element that is movable in a relative manner in the guide track of the damper mass support and in the guide track of the damper mass, specifically between a central position in which the coupling element is free from deflection in circumferential direction of the guide tracks and a deflection position in which a deflection has taken place in circumferential direction out of the central position, wherein a composite comprising the guide tracks and the coupling element associated with the latter is configured for an order that depends on the number of cylinders of the respective exciting drive.

In this respect, it is especially significant that the guide tracks of the damper mass support and/or of the at least one damper mass are tailored with respect to their geometric configuration for excitations of a virtual order between a first order with which are associated excitations of a drive with first number of cylinders and a second order with which are associated excitations of a drive with second number of cylinders, while the coupling element cooperating with these guide tracks undergoes a dimensioning associated with the first order or associated with the second order.

The initial situation provides that the guide tracks in the damper mass support and in the damper masses vary sharply depending on the number of cylinders of the drive generating the excitations. In this respect, the guide tracks of a four-cylinder drive, for example, would have a substantially greater curve radius at a piercing point, and, therefore, a substantially smaller curvature, than the guide tracks of a six-cylinder drive. The present solution to this problem consists in that, instead of providing each drive with its own guide track in the damper mass support and damper mass that is configured for the order of excitations generated by the drive, these guide tracks are made uniform. This uniformity consists in adapting to a virtual order between two different orders, preferably between two different orders that neighbor one another, in the selection of the guide tracks with respect to the geometric configuration of the guide tracks. To give a concrete example, this means that the guide tracks at the damper mass support and at the damper masses in mass damper systems which are suitable for use with both a four-cylinder drive and a six-cylinder drive are to be arranged with respect to geometric configuration for a virtual order which is associated with the excitations occurring in a five-cylinder drive which is likewise virtual. However, in order to take into account the demands of different numbers of cylinders in drives, it is provided that those coupling elements that cooperate with the guide tracks configured for the virtual order of the five-cylinder drive are dimensioned such that when used for a four-cylinder drive these coupling elements preferably formed as cylindrical rolling elements are dimensioned with a first diameter suitable for this application, and when used for a six-cylinder drive these coupling elements are dimensioned with a second diameter suitable for this application, and the diameter of the coupling elements is smaller when used for a four-cylinder drive than the diameter of the coupling elements when used for a six-cylinder drive. While the corresponding coupling element must execute fewer revolutions to move from the central position into the deflection position of the respective guide track that is farthest away in circumferential direction because of the larger diameter when used for a six-cylinder drive, the maximum deflection angle $\alpha$ that is covered in so doing does not depend on the use for the respective drive and is preferably approximately 55° proceeding from the central position.

Accordingly, the diameter of the coupling elements is predetermined in association with the geometric configuration of the guide tracks. In this respect, the diameter of the coupling elements is configured in that the radius of the respective guide tracks in the damper mass support and/or damper masses, like the center of gravity of the respective damper mass and the respective order to be damped, is predetermined and the diameter of the coupling element is calculated therefrom.

Since it is accordingly merely coupling elements of different diameters that are used for adapting the respective mass damper system to drives having different numbers of cylinders, while the guide tracks in the damper mass support and damper masses remain the same, the configuration of a mass damper system for drives with different numbers of cylinders is substantially more economical without the need to accept any functional drawbacks.

The above-mentioned solution can also be realized when the mass damper system is to be configured for two drives in which the numbers of cylinders do not allow a real intermediate value. For example, the guide tracks at damper mass supports and at damper masses in mass damper systems which should be suitable for use with both a four-cylinder drive and a three-cylinder drive are to be configured with respect to geometric arrangement for a virtual order which is associated with the excitations occurring in a 3.5-cylinder drive that is likewise virtual. But in order to take into account the demands of different numbers of cylinders in drives, it is provided that those coupling elements that cooperate with the guide tracks configured for the virtual order of the 3.5-cylinder drive are dimensioned in such a way that when used for a four-cylinder drive this coupling element is dimensioned with a first diameter which is suitable for this use, and when used for a three-cylinder drive this coupling element is dimensioned with a second diameter which is suitable for this use, and when used for a four-cylinder drive the diameter of the coupling elements is greater than the diameter of the coupling elements when used for a three-cylinder drive. The reasoning behind this has already been given in connection with the statements regarding four-cylinder drives and six-cylinder drives and need not be repeated here.

BRIEF DESCRIPTION OF THE DRAWINGS

The invention will be described in more detail in the following referring to the accompanying drawings. In the drawings.

DETAILED DESCRIPTION OF THE PRESENTLY PREFERRED EMBODIMENTS

Figure 1:
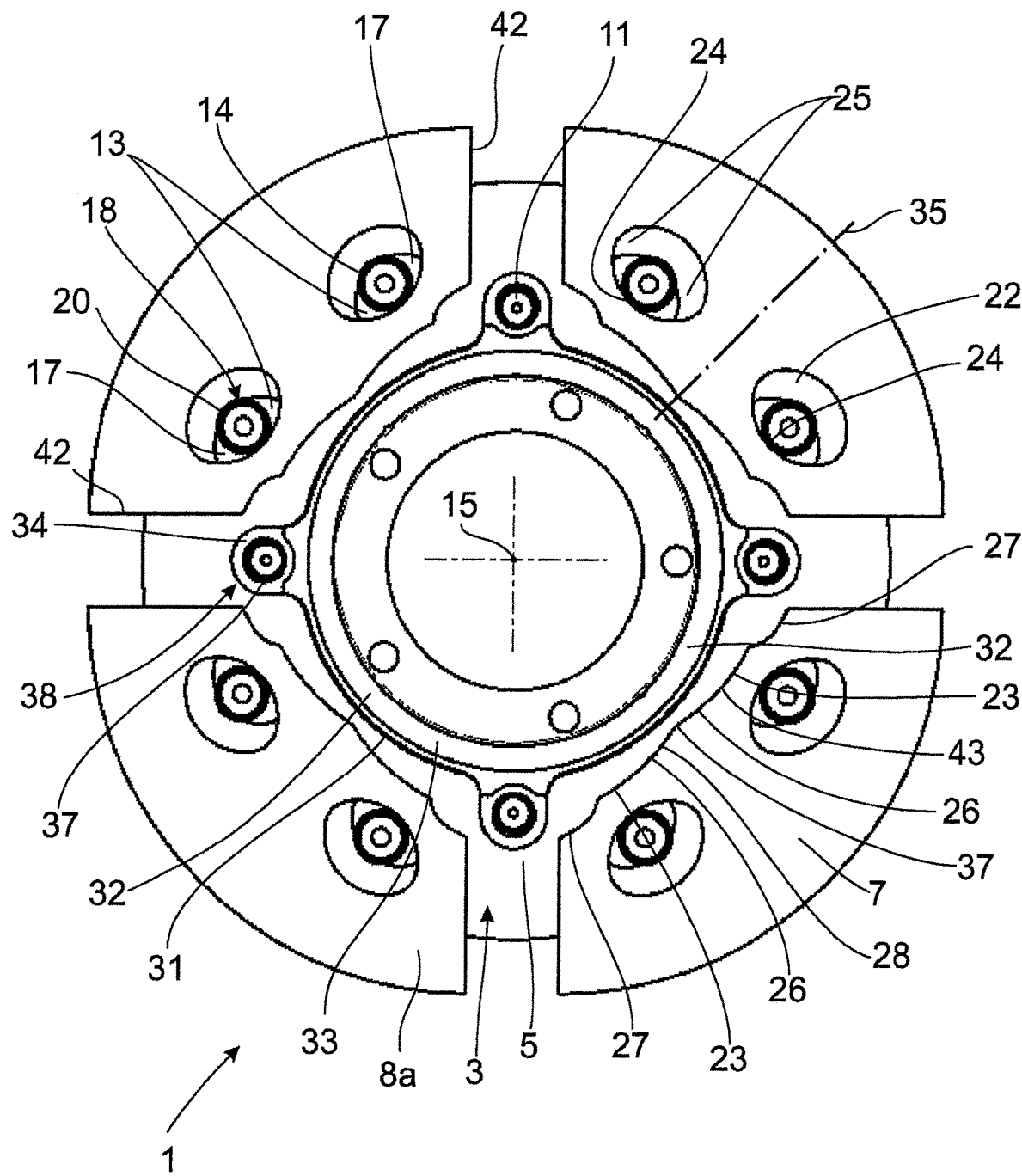
FIG. 1 is a top view of a mass damper system with damper masses and associated stops which are formed by spring elements of a suspension device, wherein the damper masses are shown in an initial position which they occupy when the centrifugal force exceeds the weight force and in the absence of torsional vibrations.

FIG. 1 shows a mass damper system 1 with a damper mass support 3 at which a plurality of damper masses 7 are received. The damper masses 7 have in each instance guide tracks 22 formed in pairs for receiving coupling elements 18 which are formed as substantially cylindrical rolling elements 20. The guide tracks 22 are configured in such a way that they allow a radial relative movement of the damper masses 7 with respect to the coupling elements 18. The damper masses 7 have stop sides 43 adjoining their circumferential sides 42 on the radially inner side.

Provided at the damper mass support 3, also by pairs in each instance, are guide tracks 13 that extend in a curved manner. According to the view in FIG. 1 or FIG. 2, the guide tracks 13 have in each instance an initial region 14 in which the respective guide track 13 is at the furthest radial distance from a central axis 15 and connection regions 17 that extend opposite to one another with respect to the circumference so as to adjoin both sides of the initial region 14. The guide tracks 22 provided at the damper masses 7 also have a curved shape with, in each instance, an initial region 24 in which the respective guide track 22 has the shortest radial distance from the central axis 15 and with connection regions 25 that extend opposite to one another with respect to the circumference so as to adjoin both sides of the initial region 14. The guide tracks 22 are provided in each instance on both sides of a damper mass center 35 of the respective damper mass 7. FIG. 1 shows the condition of the damper masses 7 during driving operation when the mass damper system 1 is operated at a speed at which the centrifugal force exceeds the weight force.

The coupling elements 18 received in the guide tracks 13 and 22 are axially adjacent to one of the guide tracks 22 and engage in each instance in the respective associated guide track 13. In the view shown in FIG. 1, the damper masses 7 tend radially outward due to centrifugal force so that the coupling elements 18 are positioned in each instance in the initial region 24 of the respective guide track 22, i.e., in that region of the guide tracks 22 having the shortest radial distance from the central axis 15. The coupling elements 18 are supported in each instance in the initial region 14 of the guide tracks 13 of the damper mass support 3, i.e., in that region of the guide tracks 13 having the greatest radial distance from the central axis 15.

The damper masses 7 have in each instance at their radially inner ends a geometric formation 28 that has a first contact region 26 in the central portion with respect to the circumference and a second contact region 27 in the outer portions with respect to the circumference. The respective first contact region 26 has a center region 37 that divides the first contact region 26 into formation halves 23. In a manner which will be described in the following, this geometric formation 28 cooperates with stops 31 provided radially inside of the damper masses 7 and arranged together at an annular component part 32.

The annular component part 32 has in each instance a holder 34 between every two damper masses 7 in circumferential direction. The holder 34 encircles a receptacle 11 in each instance so that the holder 34 serves as a stop receptacle 38 in each instance. Accordingly, the annular component part 32 is received at the damper mass support 3 so as to be fixed with respect to rotation relative to it. An annular member 33 extending in circumferential direction acts in each instance between every two stop receptacles 38 as a stop profile 40. The stop receptacles 38 and stop profiles 40 together form stops 31 at the annular component part 32.

When the mass damper system 1 is operated at a speed at which the centrifugal force exceeds the weight force, the damper masses 7 tend radially outward under the influence of centrifugal force so that the coupling elements 18 can position themselves in the initial region 24 of the respective guide track 22 of the damper masses 7. While torsional vibrations can compel deflections of the damper masses 7 in circumferential direction such that the coupling elements 18 are deflected out of the deflection regions 14, 24 of the guide tracks 13, 22 into their connection regions 17, 25, the coupling elements 18 are always restored to the initial position under the influence of the centrifugal force as the torsional vibration decays.

Figure 2:
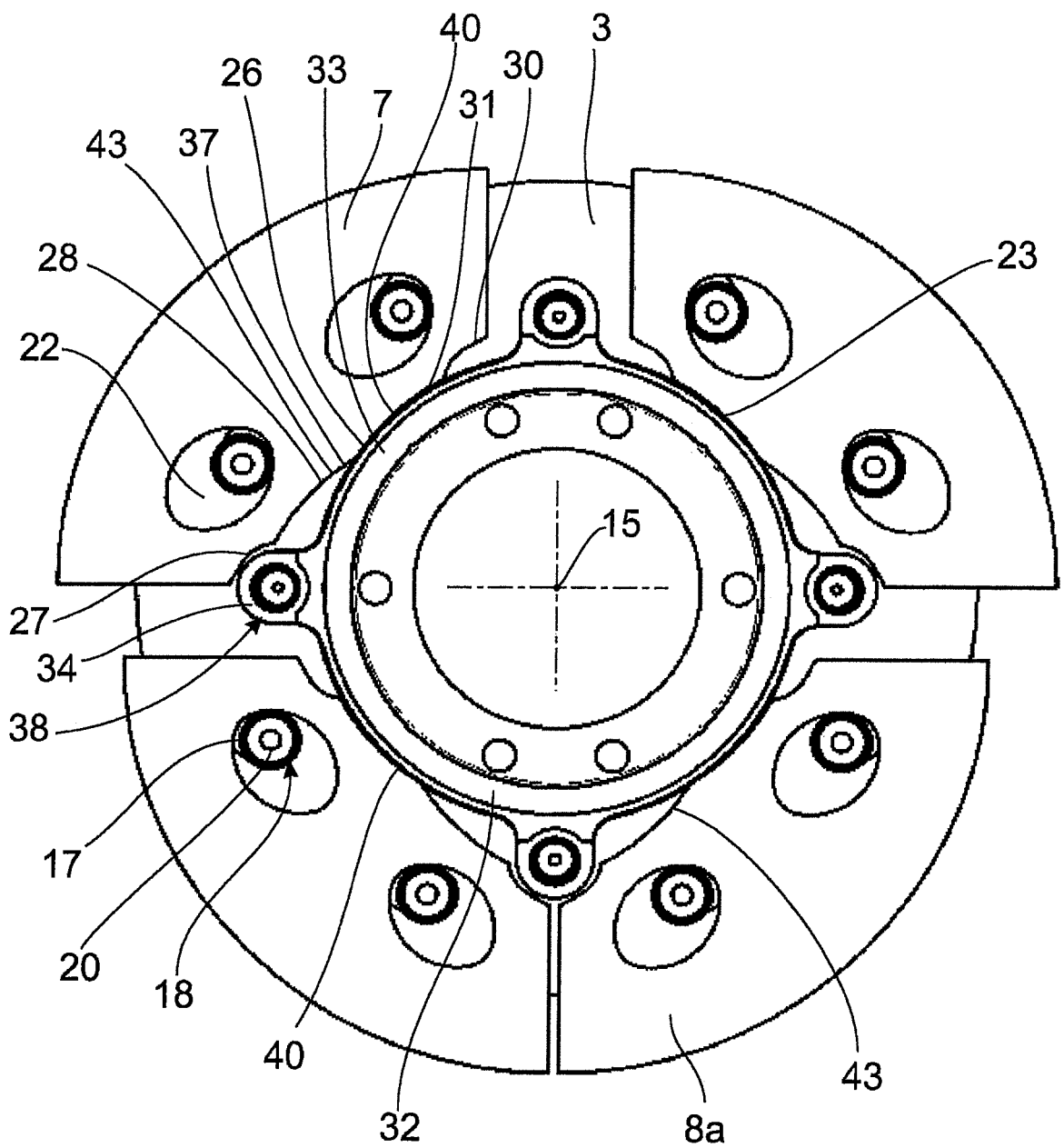
FIG. 2 is a top view of damper masses system with the damper masses in a position which they occupy when the weight force exceeds the centrifugal force.
Figure 3A:
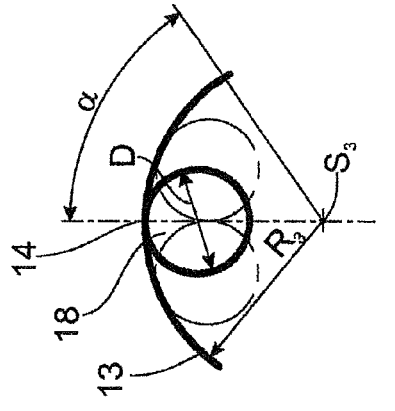
FIGS. 3a-3c are schematic views of guide tracks of the mass damper system according to the prior art in which a configuration is carried out for different orders of excitations which are to be ascribed to drives having different numbers of cylinders through different geometric configuration of these guide tracks.
Figure 3B:
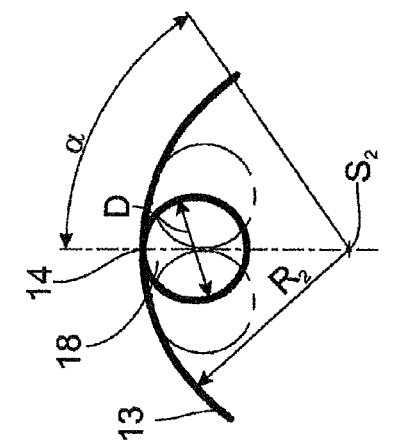
Figure 3C:
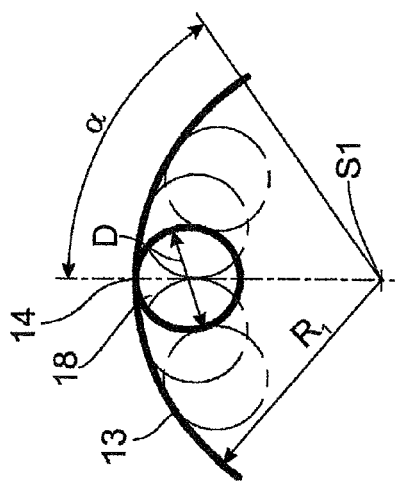

On the other hand, when the centrifugal force is exceeded by the weight force, for example, during a creep operation of a motor vehicle or when a drive, for example, an internal combustion engine, is turned off, the damper masses 7 fall radially inward and occupy the relative position, shown in FIG. 2, with respect to one another and with respect to the damper mass support 3. In an operating state of this kind, the two damper masses 7 located radially above the central axis 15 fall radially inward until their stop sides 43 come in contact with the associated stop profile 40 of the stop 31 at the annular member 33 of the annular component part 32 with the formation half 23 of the first contact region 26 that is relevant for the movement direction. If the guide tracks 13, 22 permit a further movement of the damper masses 7 radially downward, this movement does not end until the second circumferential region 27 of the respective damper mass 7 that is relevant for the movement direction comes in contact with the holder 34 and, accordingly, with the stop receptacle 38 of the annular component part 32. The two damper masses 7 located radially below the central axis 15 likewise fall radially inward until their stop sides 43 come in contact with the associated stop profile 40 of the stop 31 at the annular member 33 of the annular component part 32 with the first contact regions 26 which are formed at the stop sides 43 and which are relevant for the movement direction and, further, until the second circumferential regions 27 of the respective damper masses 7 that are relevant for the movement direction come in contact with the corresponding holders 34 and, accordingly, with the stop receptacles 38 of the annular component part 32. This prevents the two damper masses 7 located radially below the central axis 15 from coming in contact with one another by their circumferential sides 42.

Figure 4A:
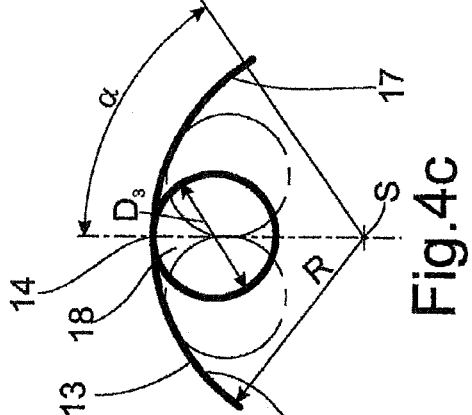
FIGS. 4a-4c are schematic views of guide tracks of the mass damper system according to the invention in which in which a configuration is carried out for different orders of excitations which are to be ascribed to drives having different numbers of cylinders through different dimensioning of coupling elements engaging in these guide tracks.
Figure 4B:
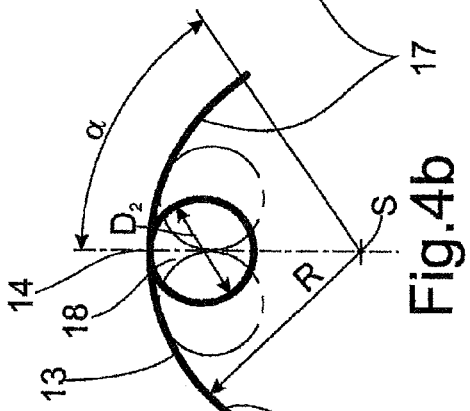
Figure 4C:
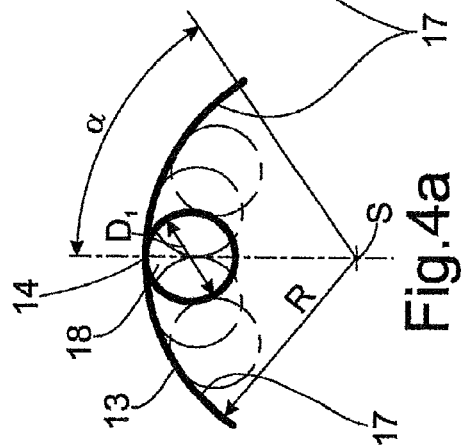

FIGS. 4a to 4c, respectively, schematically show a guide track 13 of the damper mass support 3 in which a coupling element 18 is received in each instance. As can be seen from the position of the coupling element 18 in the respective initial region 14 of the guide tracks 13, this is the driving operation described with reference to FIG. 1 without transmission of a torsional vibration, i.e., the coupling element 18 occupies its central position. Possible deflection positions of the coupling element 18 in the guide track 13 in circumferential direction lateral to the coupling element 18 shown in solid lines are shown in dashed lines. The coupling element 18 can roll out of its central position in the deflection direction on the guide track 13 until a maximum deflection angle α of about 55° is reached. Of course, the coupling element 18 will only reach its maximum possible deflection angle when there is a sufficiently strong input of energy as a result of very strong torsional vibrations. Usually, however, the coupling element 18 deflects in smaller angular ranges proceeding from its central position.

As is further shown in FIGS. 4a to 4c, the guide tracks 13 have in circumferential direction a geometric configuration with at least substantially identical radii R that proceed from at least substantially identical piercing points S, while the diameter D2 of the coupling element 18 in FIG. 4b is greater than the diameter D1 of the coupling element 18 in FIG. 4a, but smaller than the diameter D3 of the coupling element 18 in FIG. 4c. As a result, the coupling element 18 according to FIG. 4c can carry out rolling movements in circumferential direction starting from its central position, i.e., in the initial region 14 of the guide track 13, the quantity of these rolling movements being a multiple of the quantity of rolling movements of a larger-diameter coupling element 18 which is shown by way of example in FIG. 4c. It will be appreciated that as regards the quantity of rolling movements the coupling element 18 shown in FIG. 4*b* is between the coupling elements 18 shown in FIG. 4*a* or FIG. 4*c*.

Although considerable differences in the respective rolling frequency out of the initial region 14 can be achieved by specifying different diameters D1 to D3 for the coupling element 18, the deflection angle α covered in so doing remains constant and is preferably about 55°.

Figure 5:
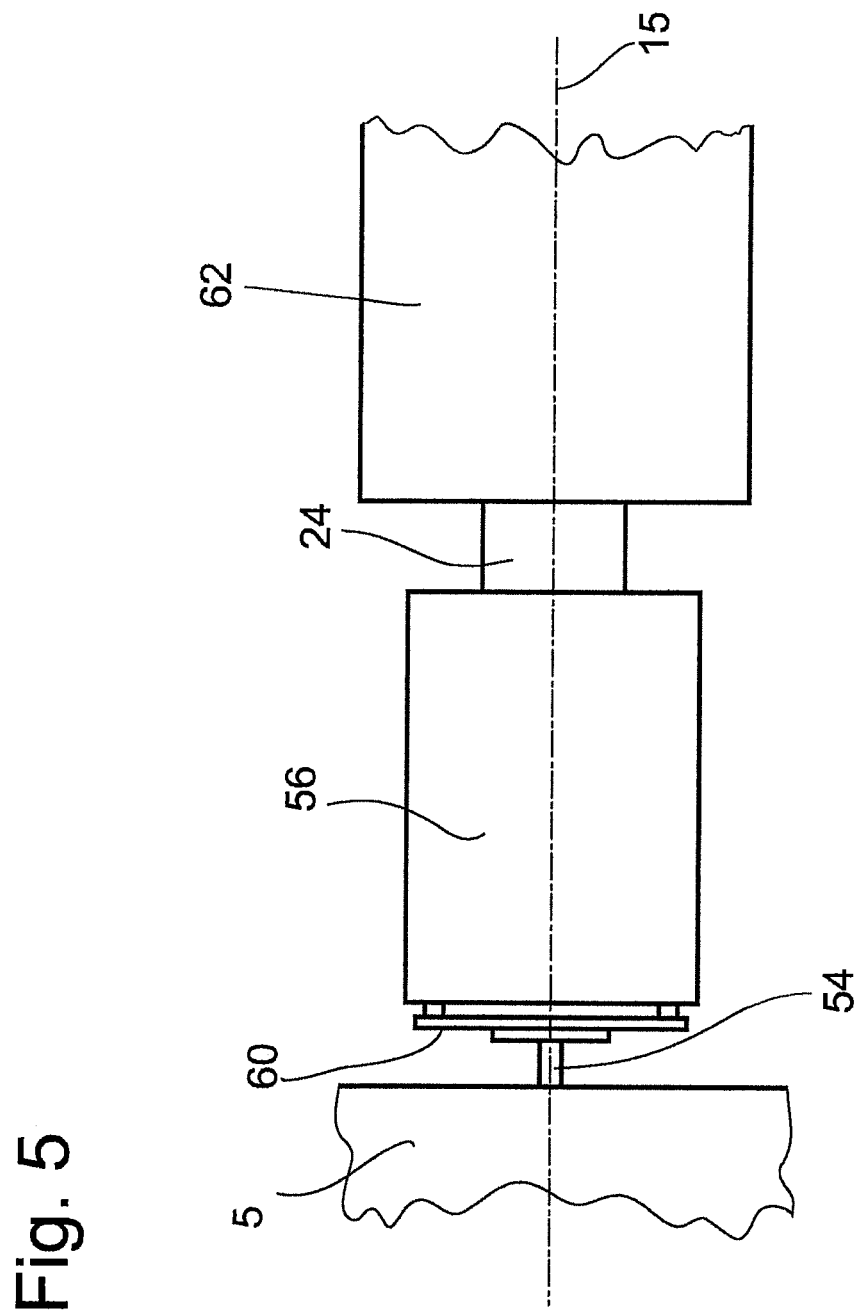
FIG. 5 is a schematic view of a powertrain.

FIG. 5 shows a powertrain such as is suitable for receiving the mass damper system 1. Accordingly, a drive 5 in the form of an internal combustion engine has a crankshaft 54 which is connected, for example, to a coupling arrangement 56 by a drive plate 60. This coupling arrangement 56 can be formed as a flywheel, as a dual-mass flywheel, or as a hydrodynamic clutch device and serves to receive the mass damper system 1. Finally, the coupling arrangement 56 is connected to a transmission 62. FIG. 5 shows that the crankshaft 54 of the drive 5, like the mass damper system 1, is capable of rotating around the central axis 15.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A mass damper system kit that damps excitations for a plurality of orders, comprising:
   at least one damper mass having a damper mass guide track;
   a damper mass support having at least one support guide track and configured to receive the at least one damper mass;
   a plurality of coupling elements each configured to operatively connect the damper mass support and the at least one damper mass so that each coupling element is movable in the at least one support guide track and in the damper mass guide track between a central position in which each coupling element is free from deflection in circumferential direction of the at least one support guide track and the damper mass guide track and a deflection position in which a deflection has taken place in circumferential direction out of the central position,
   wherein a composite comprising the at least one support guide track, the damper mass guide track, and a respective coupling element, the respective coupling element is configured for an order depending on a number of cylinders of a respective exciting drive,
   wherein the at least one support guide track and the damper mass guide track are tailored with respect to their geometric configuration for excitations of a virtual order between a first order with which are associated excitations of a first drive with a first number of cylinders and a second order with which are associated excitations of a second drive with a second number of cylinders,
   wherein a diameter of each coupling element is dimensioned based on the first order or the second order such that the diameter of the rolling elements is greater in the first drive with a larger number of cylinders than the second drive with a smaller number of cylinders,
   wherein the first drive generates excitations of a higher order than the second drive with second number of cylinders,
   wherein the at least one support guide track and the damper mass guide track are configured with respect to their geometric arrangement in accordance with the virtual order that lies in a middle between the first order and the second order to damp excitations for the first order and the second order.

2. The mass damper system kit according to claim 1, wherein each of the coupling elements is a substantially cylindrical rolling element.

3. The mass damper system kit according to claim 1, wherein the deflection that has taken place in circumferential direction out of the central position is constant for different diameters of the at least one coupling element.

4. The mass damper system kit according to claim 1, wherein the constant deflection angle for the different diameters of the at least one coupling element is 55°.

* * * * *